April 7, 1931. J. C. HUGHES 1,800,143
SEALING MEDIUM
Filed Oct. 29, 1928
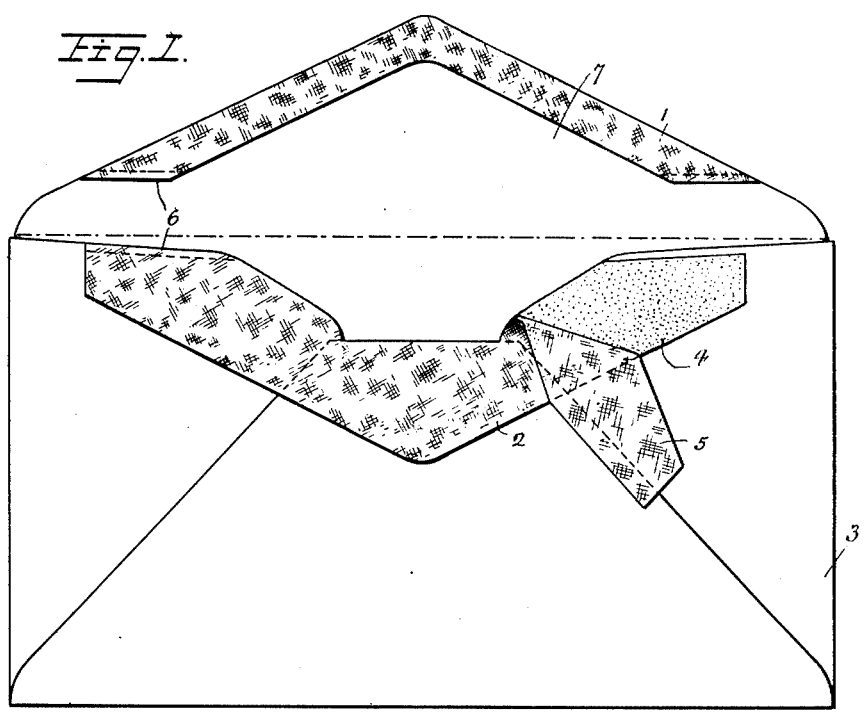
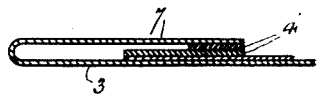
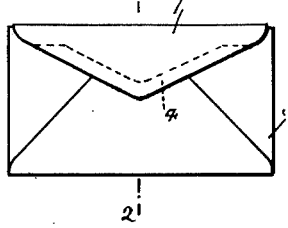
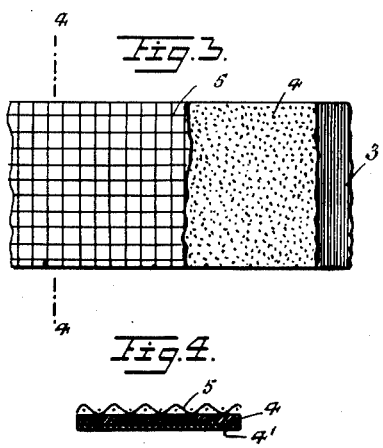
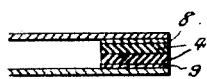
WITNESSES
H. T. Walker
A. L. Kitchin
INVENTOR
J. C. Hughes
BY
ATTORNEY Patented Apr. 7, 1931

1,800,143

UNITED STATES PATENT OFFICE

JAMES C. HUGHES, OF NEW CITY, NEW YORK

SEALING MEDIUM

Application filed October 29, 1928. Serial No. 315,753.

This invention relates to a sealing medium and has for an object to provide an improved construction which may be used for sealing many objects, as for instance, envelopes, labels and photographs.

Another object of the invention is to provide a sealing medium for envelopes or any desired article, wherein the sealing medium is always ready for use without the addition of water or other means.

A still further object of the invention, more specifically, is the provision of a rubber sealing medium or agent formed entirely of uncured or raw rubber or of a layer of cured and raw rubber positioned on the article to be sealed, so that two similarly shaped members will come in contact when the sealing operation has been completed.

In the accompanying drawing,—

Figure 1 is a plan view of an envelope with a sealing medium embodying the invention shown applied thereto;

Figure 2 is a fragmentary sectional view through Figure 6 approximately on the line 2—2;

Figure 3 is a plan view of part of one of the strips shown in Figure 1;

Figure 4 is a sectional view through Figure 3 on the line 4—4;

Figure 5 is a sectional view similar to Figure 2 but showing a modified form of the invention;

Figure 6 is a plan view on a reduced scale of the envelope and sealing medium shown in Figure 1, the same being illustrated closed.

Referring to the accompanying drawing by numerals, 1 and 2 indicate sealing members applied to the flap and body respectively of the envelope 3. Heretofore on envelopes glue or some form of similar adhesive has been used, but in the present invention the sealing agents or mediums 1 and 2 are formed of rubber. The members 1 and 2 are identical, so that the description of one will apply to both. As indicated in Figure 1, the medium 2 is shown as comprising a strip 4 of uncured rubber and a covering or protecting strip 5 of cloth, paper or other desired protecting element. The strip 4 is a very thin sheet of uncured rubber and may be secured to the envelope in any desired manner, as for instance, by glue when the envelope is manufactured. The strip 5 is left in place while strip 4 is being secured to the envelope. Preferably the strip 5 is provided with an overhanging portion 6 at one end or both ends, as desired, whereby when the envelope is to be sealed strip 5 is removed from both of the members 1 and 2 and then the flap 7 is closed. As soon as the strips 4 on the respective members 1 and 2 have been pressed together, as illustrated in Figure 2, they will merge together and form one solid piece so that the flap 7 is firmly held closed. The sealing medium has been described in respect to an envelope and shown on an envelope, but it is understood that it may be used on many other articles and in each instance there must be two coacting members of identical shape, so that when the parts to be sealed are brought together these two members may merge as just described in regard to the strip 4. Figure 3 really shows a plan view of part of the strip 2, while Figure 4 is a section through the part illustrated in Figure 3, together with the mucilage or glue coating 4'. As illustrated particularly in Figure 4, the layer 4 is secured to the envelope 3 by glue or other adhesive 4' and is protected by the covering member 5 which adheres thereto but not sufficiently to prevent its removal.

In Figure 5 a modified form of the invention is shown, wherein cured layers of rubber 8 and 9 are arranged beneath the strips or layers 4 of uncured rubber and these layers are held together by the adhesive quality of the uncured rubber which firmly holds the layers together. These combined layers of cured and uncured rubber are identical in their specific structure with the standard repair patches or repair rubber members now used in various repair kits on the market. These combined strips are glued or otherwise secured in place as heretofore described, and the uncured strips merge when pressed together after the protecting coverings 5 have been removed. In the drawing the various layers have been shown comparatively thick, but it is to be understood that these layers are preferably very thin so as not to present an objectionable thickness at the sealing point. By using a sealing medium as described the objectionable features of glue or similar adhesive are eliminated, as the covering strips 5 prevent the fingers of a person from coming in contact with strips 4 and also prevent the sealing of the envelope or other article until the strips 4 have been uncovered. By this means stacks of envelopes or other articles may be readily transported or handled without danger of the envelopes becoming sealed. The coacting pieces of adhesive may be of different sizes and shapes but must always be arranged so that all or some part of the respective or opposite pieces will engage when the two articles are to be secured together. This is illustrated in Figure 1 wherein the lower member is much wider than the member on the flap. This permits the flap to be sealed closed providing the adhesive member thereon is brought in contact with some part of the adhesive member on the body of the envelope. The respective adhesive members are arranged in strips as this is preferable, but if desired they can be formed into separate pieces and spaced apart either in rows or some other arrangement, but always so that some or all of the members on the flap may engage some or all of the members on the body of the envelope.

What I claim is:—

A sealing medium for envelopes, comprising coacting pieces of uncured rubber, an adhesive for securing the rubber to the envelope, the piece of uncured rubber on the body of the envelope being appreciably wider than the piece on the flap, whereby the flap may be bent along different lines without preventing the uncured rubber thereon from contacting with the coacting piece on the body of the envelope when the flap is closed, and a removable protecting piece mounted on the outer surface of said pieces of uncured rubber.

JAMES C. HUGHES.